(12) United States Patent
Steiner et al.

(10) Patent No.: US 7,871,261 B2
(45) Date of Patent: Jan. 18, 2011

(54) INJECTION-MOLDING APPARATUS FOR PRODUCING PROFILED ELONGATED PARTS

(75) Inventors: Gottfried Steiner, Spielberg (AT); Thomas Krivec, Zeltweg (AT)

(73) Assignee: Dipl. Ing. Gottfried Steiner (AT)

( * ) Notice: Subject to any disclaimer, the term of this patent is extended or adjusted under 35 U.S.C. 154(b) by 6 days.

(21) Appl. No.: 12/299,547

(22) PCT Filed: May 4, 2007

(86) PCT No.: PCT/EP2007/054333

§ 371 (c)(1), (2), (4) Date: Jul. 7, 2009

(87) PCT Pub. No.: WO2007/128787

PCT Pub. Date: Nov. 15, 2007

(65) Prior Publication Data

US 2009/0304843 A1 Dec. 10, 2009

(30) Foreign Application Priority Data

May 5, 2006 (AT) ............................... A 786/2006

(51) Int. Cl.
*B29C 45/36* (2006.01)
(52) U.S. Cl. ................. 425/577; 249/155; 249/158; 264/328.7
(58) Field of Classification Search .............. 425/577; 264/328.7; 249/155, 158
See application file for complete search history.

(56) References Cited

U.S. PATENT DOCUMENTS 4,257,145 A * 3/1981 Bovino .................. 425/556

6,524,094 B1 * 2/2003 Kader .................. 425/556
2004/0052894 A1 3/2004 Rudolph et al.
2008/0251963 A1 10/2008 Steiner et al.

FOREIGN PATENT DOCUMENTS

WO 02/57064 7/2002
WO 2006/045720 5/2006

OTHER PUBLICATIONS

International Search Report with English Language translation dated Aug. 7, 2007, issued in corresponding international application No. PCT/EP2007/054333.

* cited by examiner

*Primary Examiner*—Tim Heitbrink
(74) *Attorney, Agent, or Firm*—Ostrolenk Faber LLP

(57) ABSTRACT

The invention relates to an injection molding installation with a fixed and a moveable machine clamping plate, and at least one injection unit as well as an injection molding device which is located between the machine clamping plates for producing profiled parts, elongated at least in sections, by means of closure-side components which are assigned to the one machine clamping plate, and nozzle-side components which are assigned to the other machine clamping plate, as well as a slide module which is located between these components and which has a slide which is arranged in a moveable manner on a closure-side or nozzle-side component, wherein said slide contributes to form an original mould cavity, and a drive module for controlling the movement of the moveable part(s) of the slide module, wherein the part is produced in the intended dimension and shape inside and outside the mold via the movement of the slide. An at least partial functional integration of at least the closure-side components, and/or the drive module, and or the slide module in one or more components in the installation is intended.

11 Claims, 11 Drawing Sheets

INJECTION-MOLDING APPARATUS FOR PRODUCING PROFILED ELONGATED PARTS

Figure 1:
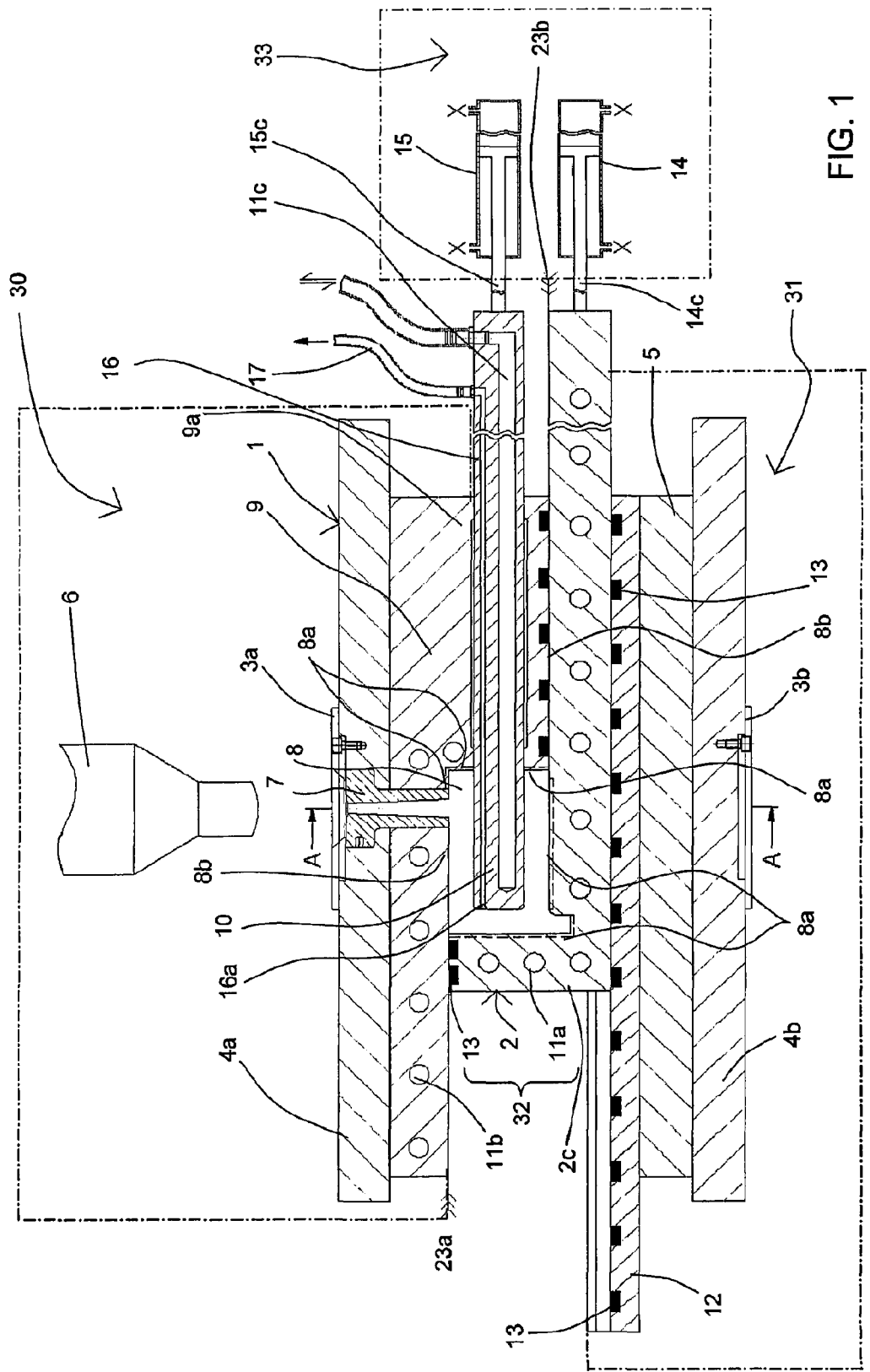

The invention relates to an injection moulding installation with a fixed and a moveable machine clamping plate, and at least one injection unit as well as an injection-moulding device which is located between the machine clamping plates for producing profiled parts, elongated at least in sections, by means of closure-side components which are assigned to the one machine clamping plate, and nozzle-side components which are assigned to the other machine clamping plate, as well as a slide module which is located between these components and which has a slide which is arranged in a moveable manner on a closure-side or nozzle-side component, wherein said slide contributes to form an original mould cavity, and a drive module for controlling the movement of the moveable part(s) of the slide module, wherein the part is produced in the intended dimension and shape inside and outside the mould via the movement of the slide.

Injection moulding installations are known in different embodiments. Typical injection moulding installations comprise as the main components a fixed machine clamping plate, and, on the opposite side thereof, a moveable machine clamping plate. Furthermore, on the side of the fixed machine clamping plate, the injection unit is located from which the moulding compound is transported to the sprue bush(es) of the injection mould. The sprue bush is located in a mould part of the injection mould, wherein the mould part is mounted detachable on the fixed machine clamping plate by means of clamping elements or the like. A further mould part, the closure-side mould part of the injection mould, is mounted detachable on the moveable machine clamping plate by means of clamping elements.

The document PCT/EP 2005/055343 is concerned with a novel method and a novel device for producing profiled and at least sectionally elongated parts of liquid, or viscous, or solidifying moulding compounds. For this, the moulding compound is injected into an original mould cavity which expands to a moulding area after the filling-up with moulding compound while continuing the injection, wherein the injected compound is continuously transported away while the part to be formed is extending until the compound finally discharges out of the mould. The moulding compound is injected until the part to be formed has reached its final length. The injected compound is transported away by means of a slide which leaves the injection mould together with the solidified compound. The main components of the injection mould operating according to such a method can be classified into the modules given in the preamble of claim 1. A detailed description of the individual modules is included in the description of the Figures and is illustrated therein by means of the FIGS. 1 to 6.

The invention is based on the object to design an injection moulding installation such that by using the new injection moulding technology, parts can be produced in high quantities in a particularly cost-effective manner.

The injection moulding installation according to the invention is characterised by an at least partial integration of the closure-side components, and/or the drive module, and/or the slide module in one or more components of the installation.

In an injection moulding installation according to the invention, components of the actual injection mould are integrated in the installation so that these installation parts take over the respective functions of injection moulding components. Components of the injection moulding installation are therefore structurally adapted or designed accordingly. Thereby, the number of mould components is reduced, and the complexity of the whole installation is decreased. The integrated installation concept according to the invention thus offers considerable economic advantages primarily for the production of parts in high quantities.

In an injection moulding installation according to the invention, components and/or modules which are not functionally integrated remain replaceable (claim 2). Thus, it can be decided in each individual case which of the components or modules, respectively, in the sense of a preferably cost-effective and efficient production, are to be integrated in components of the installation, and which are to be replaceable.

In a variant of an embodiment of the invention, closure-side components of the injection moulding device, preferably all closure-side components of the injection moulding device, are integrated in the moveable machine clamping plate (claim 3). The slide of the slide module can be integrated at the same time in a further integration step (claim 4). By means of these measures, a highly integrated installation concept is provided which, primarily for the production of components in high quantities, leads to economic advantages.

Nozzle-side components of the injection moulding device can also be integrated, in particular in the fixed machine clamping plate (claim 5). If, in addition, the closure-side components and the slide are integrated, the directly forming components remain as replaceable part; these are in particular the inserts provided on the closure side and the nozzle side. The hence given full integration is particularly cost efficient with respect to the investment cost, and especially, when high quantities are produced.

On the slide, if integrated or not, replaceable inserts can be positioned in any case (claim 6). In case of an integrated slide, its predetermined geometry admittedly limits the number of possible component variants, in particular the maximum component length is predetermined by the slide length, but, as already mentioned, the highly integrated installation concept offers economic advantages in the production of high quantities.

In one of the possible variants of an embodiment of the invention, the drive module is constructionally attached on the side of the movable machine clamping plate, and is provided with interface parts for a detachable coupling to the slide and/or further movable mould components (claim 7). An arrangement of the drive module on the machine clamping plate further allows a replaceable arrangement of the slide module.

With an integration of the slide, the drive module can also be attached to the slide (claim 8). Depending on the concept, this can lead to advantages for the production of components with certain geometries.

An integrated drive module can advantageously be controlled and feedback-controlled by the central feedback control and control of the injection moulding installation (claim 9).

Further features, advantages and details of the invention are described in more detail by means of the drawing which schematically illustrates a plurality of exemplary embodiments.

In the figures

Figure 2:
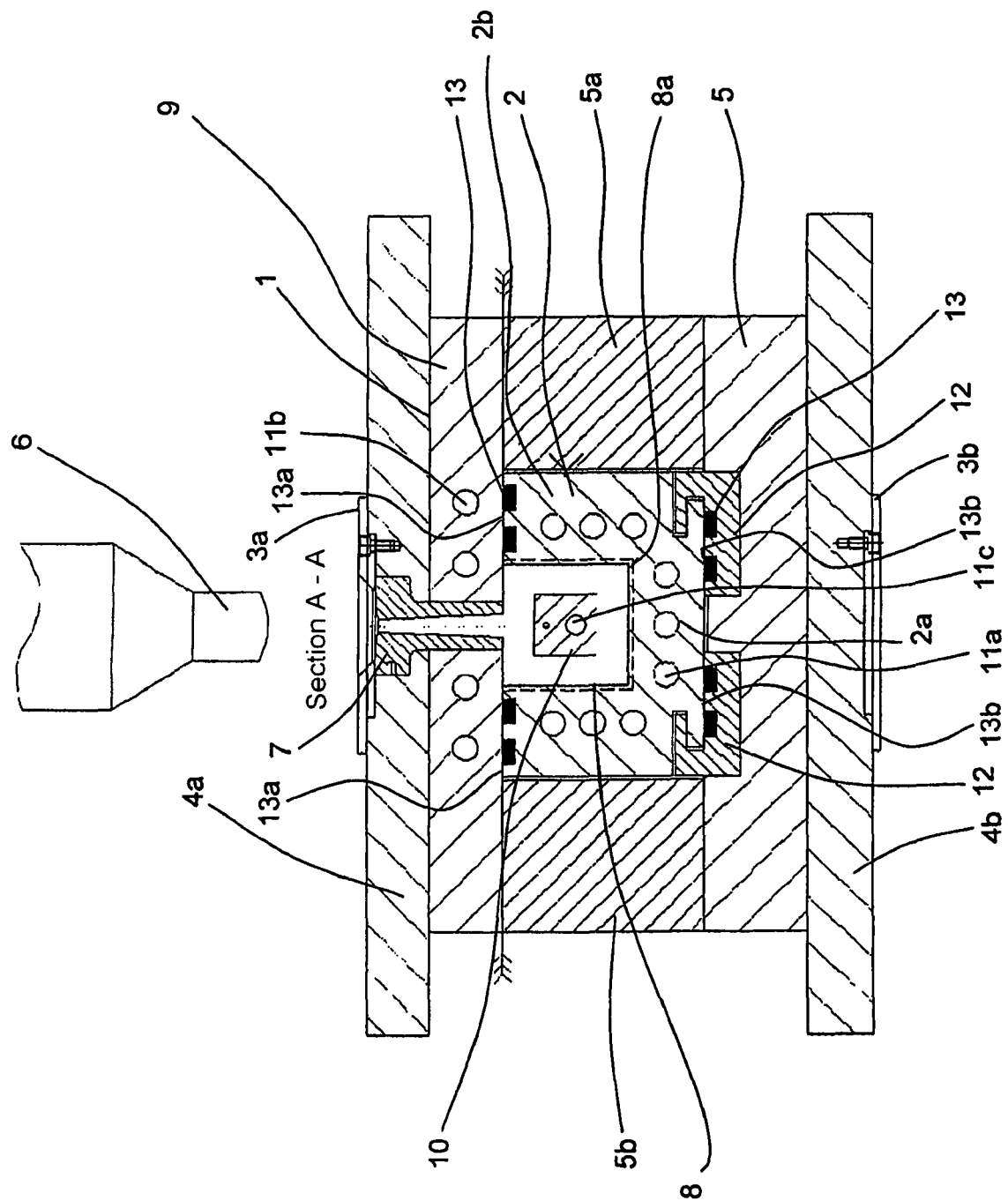
Figure 4:
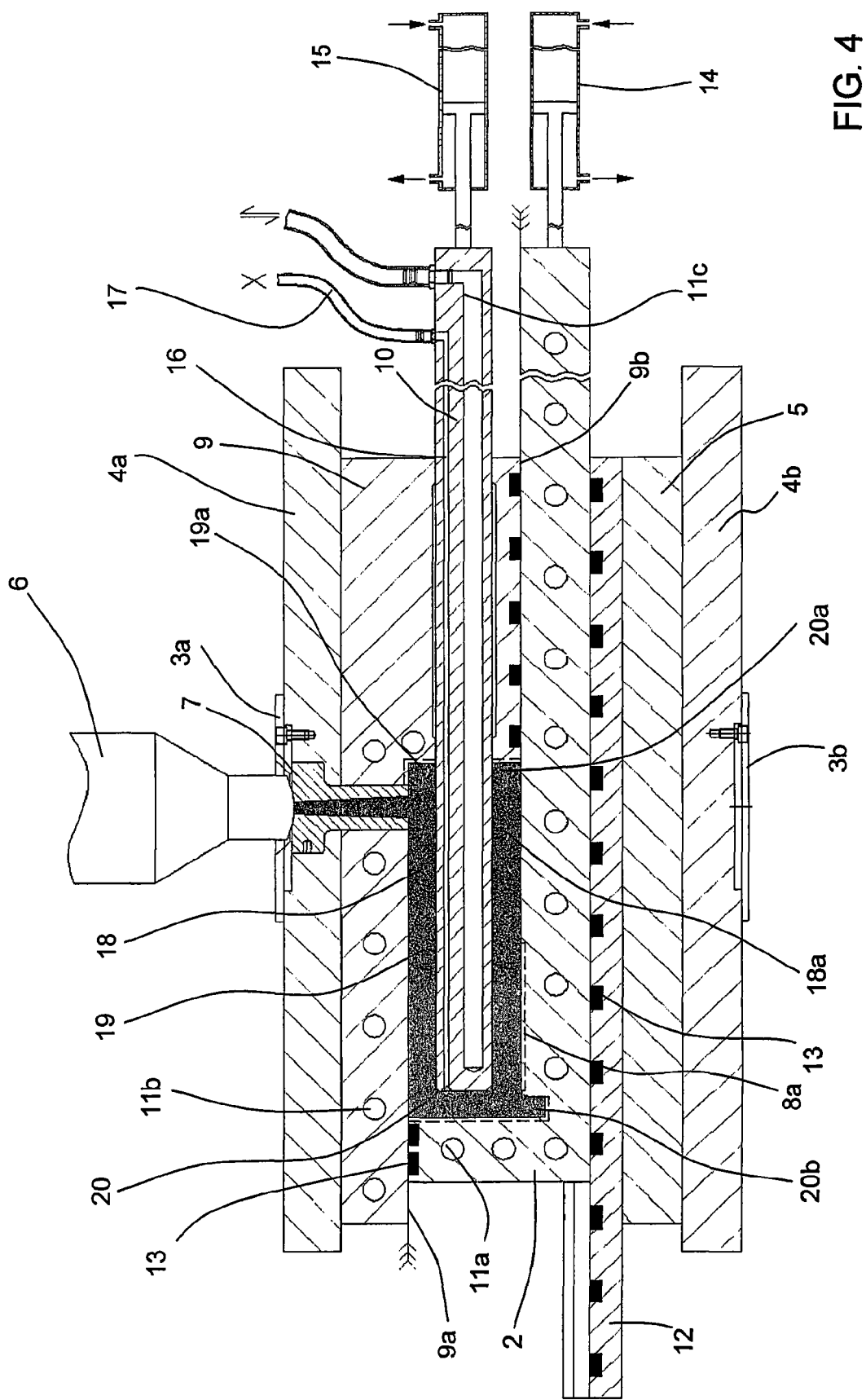
Figure 5:
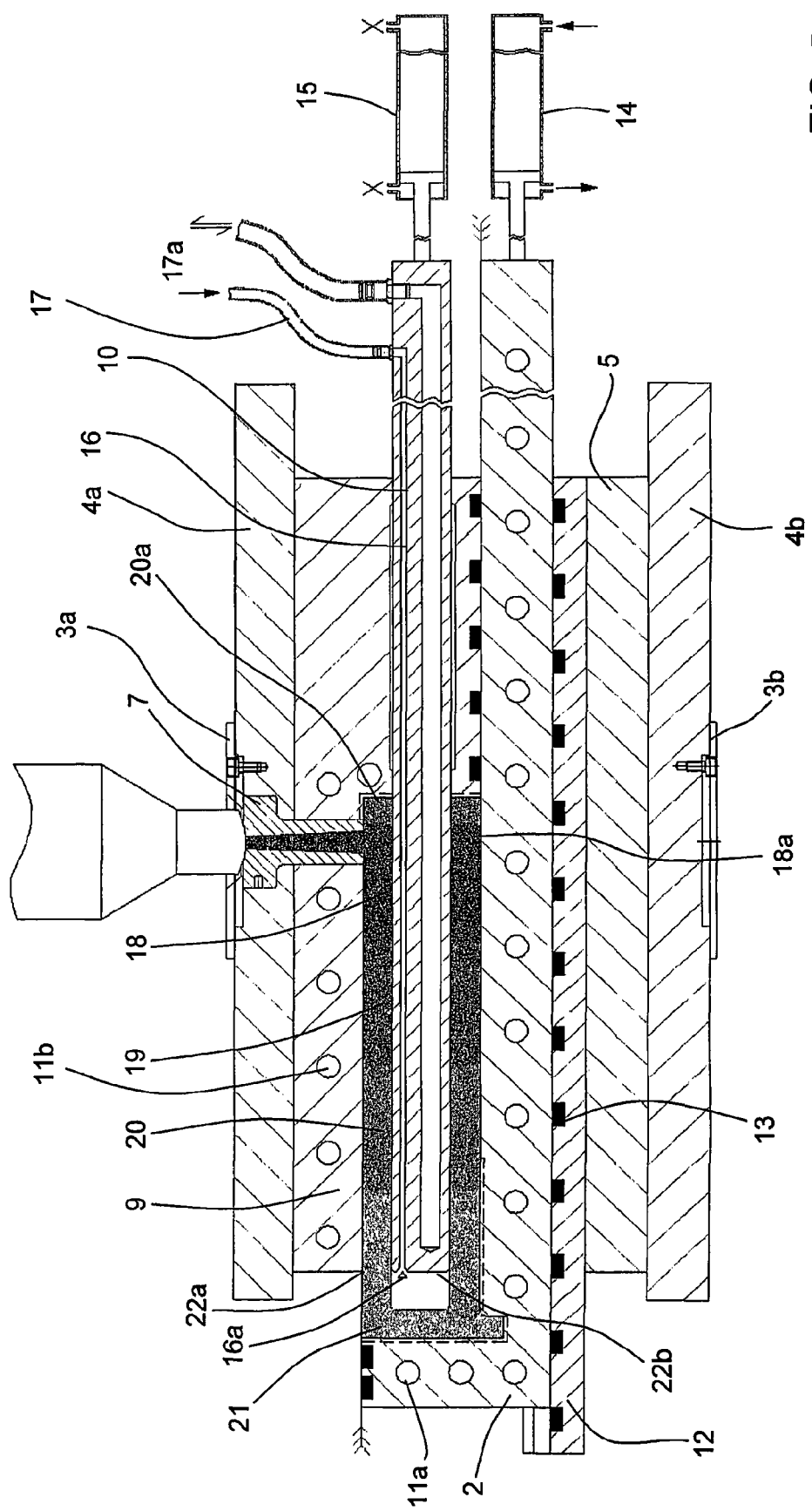
Figure 6:
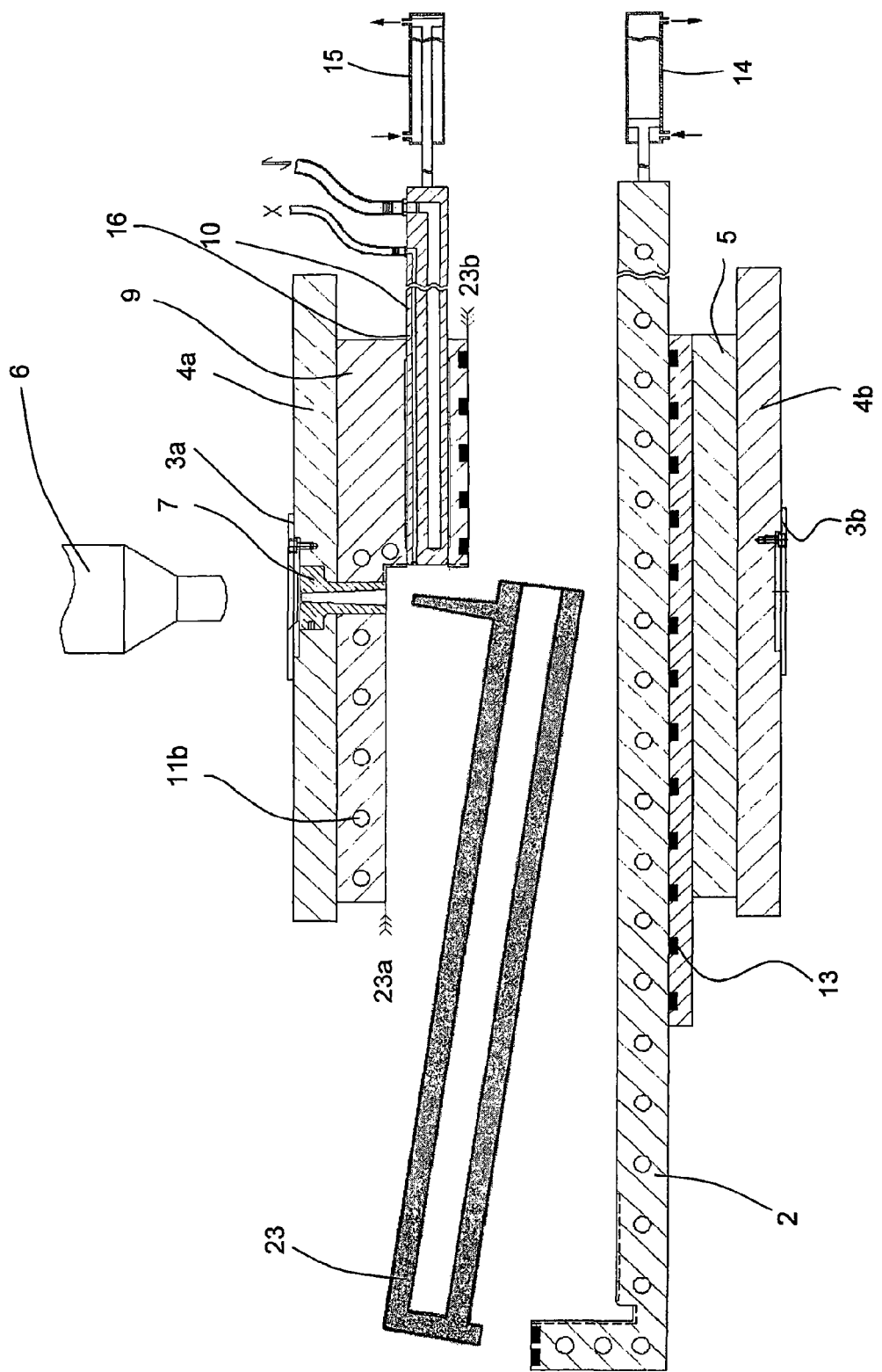
Figure 7:
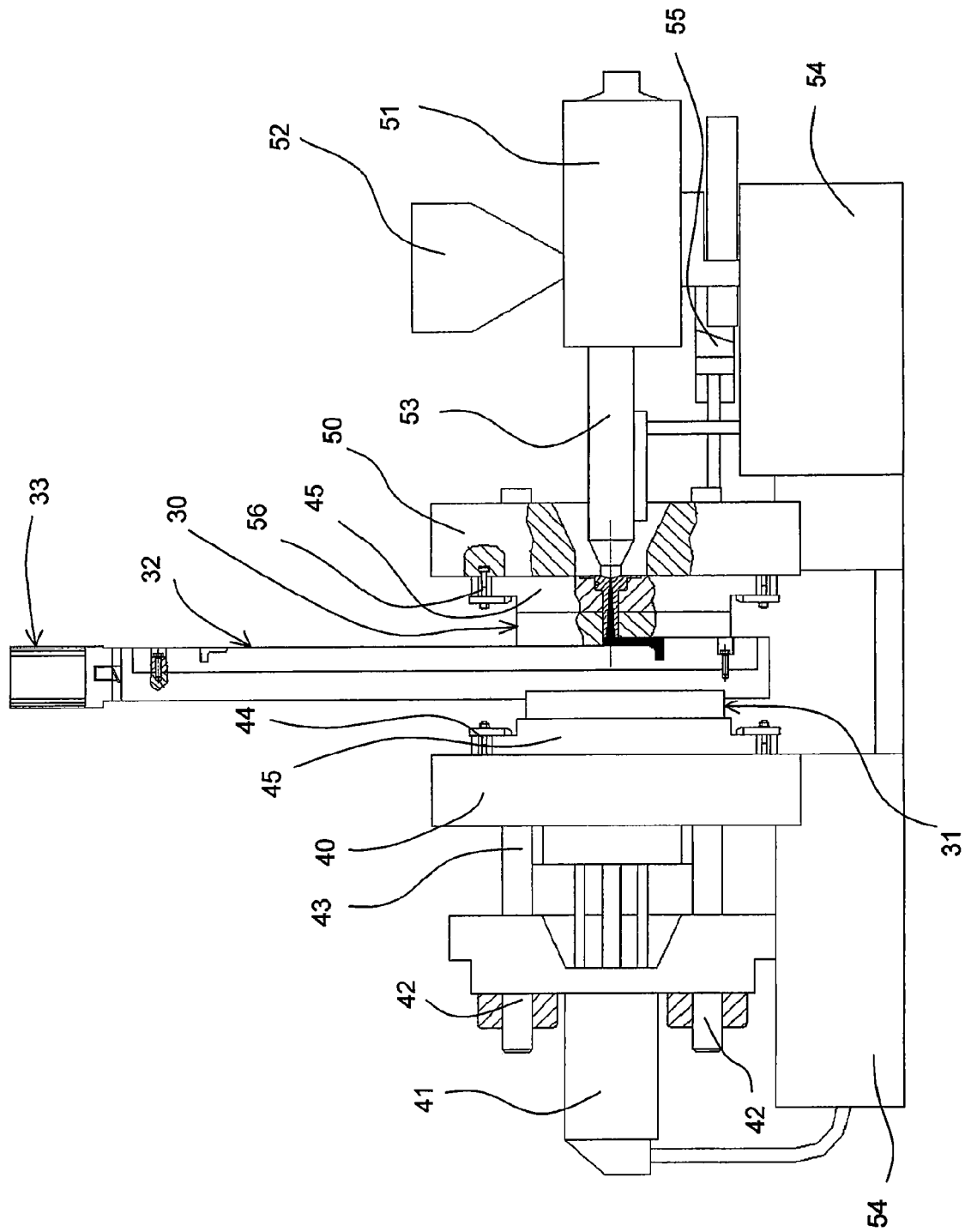

FIG. 1 to FIG. 6 show an embodiment of an injection mould, partially in different phases of the injection process, FIG. 1 shows a longitudinal section through this injection mould, FIG. 2 shows a cross section along the section plane indicated by the line A-A of FIG. 1, FIG. 3 to FIG. 5 show, with reference to FIG. 1, analogue longitudinal sections in different phases during the injection, FIG. 6 shows in a longitudinal section the open injection mould according to FIG. 1 after completion of the injection mould process, FIG. 7 shows a simplified and schematic variant of the injection mould according to FIGS. 1 to 6, integrated in an injection moulding installation, FIG. 8, FIG. 9, FIG. 10a, and FIG. 10b show different variants of the functional integration of mould components or mould modules of the injection mould, respectively, in the injection moulding installation.

FIG. 1 to 6 show a injection mould designed according to the International Patent Application PCT/EP 2005/055343. The illustrated injection mould is one variant out of a variety of variants of designing injection moulds according to the mentioned PCT application.

Components of a mould part of the injection mould shown in FIG. 1 are a fixed mould insert 9 arranged on a clamping plate 4a, a sprue bush 7 penetrating the mould insert 9 and the upper clamping plate 4a, and an upper centering ring 3a which is mounted on the upper clamping plate 4a. The clamping plate 4a together with the fixed mould insert 9 and the further components arranged or mounted, respectively, on these parts, form the nozzle-side components or the nozzle-side mould module 30, respectively.

To a further mould part belong a second clamping plate 4b, a second centering ring 3b mounted thereon, and mould plate 5 which is connected with the clamping plate 4b and which has support rails 5a, 5b which can be seen in FIG. 2. These components, and, if necessary, further elements of the injection mould arranged thereon, form the closure-side components or the closure-side module 31, respectively.

On the mould plate 5, a slide 2 is arranged moveable, and on the fixed mould insert 9, a core 10 is arranged moveable. The mould insert 9, which is designed as an approximately plate-shaped component having a projection 9a, is penetrated in longitudinal direction by a rectangular opening for a moveable mounting of the core 10, as it is shown in particular in FIG. 1 in connection with FIG. 2. The projection 9a of the mould insert 9 is located inside on a base side 2a of the slide 2 which has a U-shaped cross section, and which abuts the mould insert 9 with two further lateral sides 2b, as shown in FIG. 2. The slide 2 is provided on the inner side with a geometry which is adapted to the geometry of the component to be moulded, or can be equipped with corresponding inserts.

The core 10 and the slide 2 form a further module of the mould which is denoted hereinafter as slide module 32.

Between an end section of the core 10 exceeding the projection 9a, the sides 2a, 2b of the slide 2, and a front wall 2c of the same, an initial mould cavity 8 is formed.

In another embodiment of the injection mould which is illustrated in FIGS. 7 to 10 of the above cited PCT/EP 2005/055343, no core is provided, but only a moveable mould insert. In further embodiment variants, which are also disclosed in the cited PCT/EP 2005/055343, two or more sprue bushes can provided for the plastic melt.

The mould insert 9, the slide 2 and the core 10 can be temperature controlled via cooling channels 11a, 11b, 11c to influence the solidification process. In the areas 8a, the mould cavity surfaces can be structured three-dimensional since here a relative movement with respect to the moulded part takes place during the injection moulding process. Mould cavity surfaces 8b with a relative movement can have structures which run in the direction of the occurring movement. The same applies for the surface of the core 10. The moveable slide 2, as shown in FIGS. 1 and 2, is guided moveable in longitudinal direction in two guide rails 12. The core 10 is guided in the fixed mould insert 9. A number of sliding elements 13 inserted in the slide 2, in the mould insert 9, and in the guide rails 12, facilitate the sliding or the relative movement, respectively, between the slide 2 and the fixed mould insert 9, as well as the slide 2 and the guide rails 12.

A further module, which is denoted hereinafter as drive module 33, is responsible for the movement of the moveable slide 2 as well as of the core 10. Components of the drive module 33 can be motors which are not shown, which set the linear drives 14, 15 which are shown in FIG. 1 in motion, and which can be actuated manually, electrically, mechanically, or, as shown, hydraulically. The movement of the slide 2 can additionally be influenced or triggered, respectively, by the injection pressure active in the mould cavity 8.

The core 10 which is designed as an elongated component with a rectangular cross section, is penetrated in longitudinal direction by a bore 16 which, at the core's 10 front side end located in the mould cavity 8, leads into a gas valve 16a. At the other end of the bore 16, compressed air, or a different gas, or a liquid can be blown through a hose 17 into the mould cavity 8.

FIG. 1 and FIG. 2 show the initial state with already closed mould. The mould cavity 8 can be filled with air, flushed with inert gas, or evacuated. By means of the clamping plates 4a, 4b, the closing force is applied onto the mould.

Figure 3:
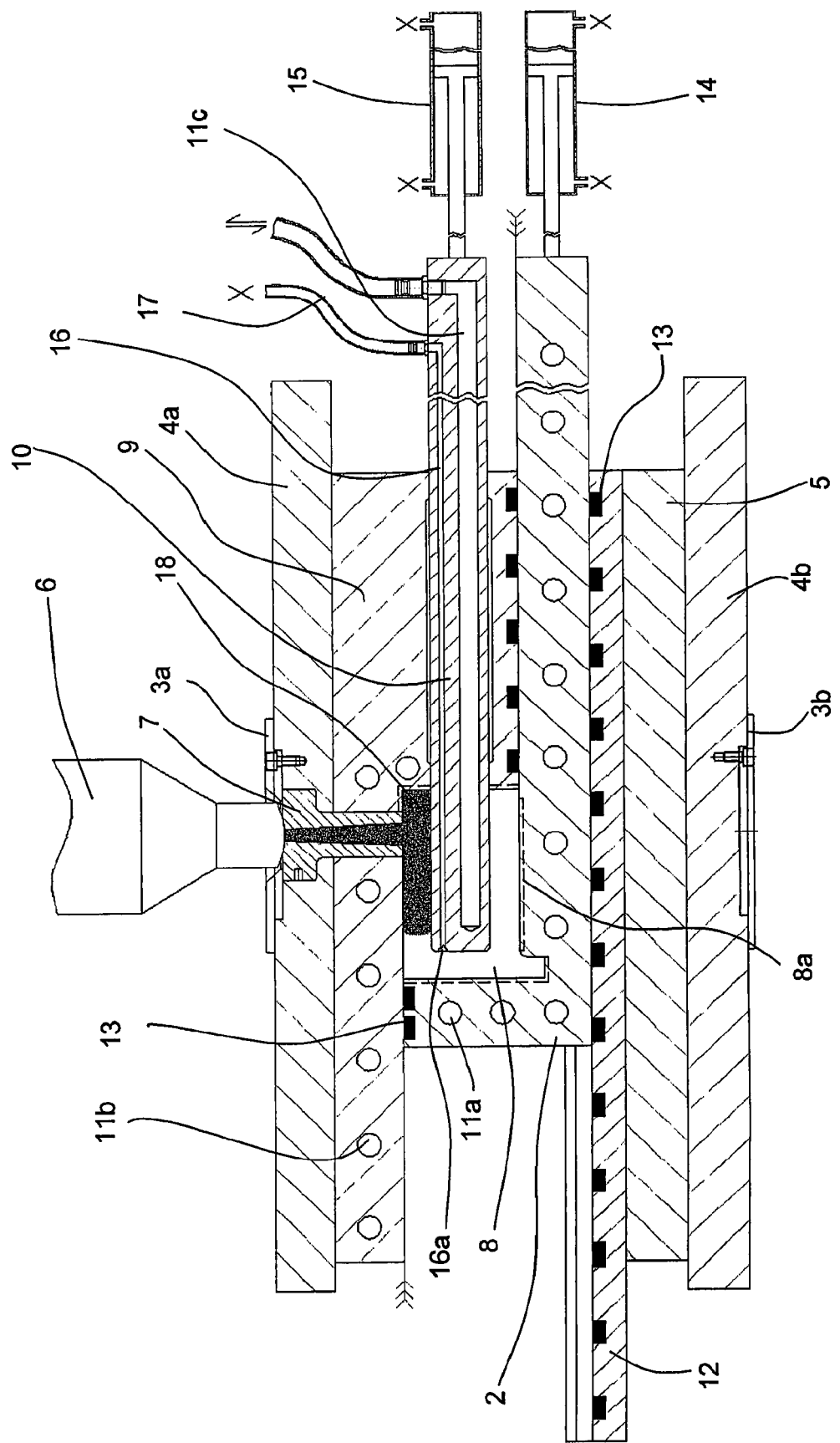

FIG. 3 shows the beginning of the injection process. The injection unit 6 is arranged on the sprue bush 7 and plasticized compound 18 is injected into the mould cavity 8. The valves of the linear drives 14, 15 as well as the gas valve 16a are closed.

As soon as the initial volume of the mould cavity is filled with compound 18, in the mould cavity 8, pressure builds up which, against the resistance of the linear drives 14, 15, and against the friction losses which depend on the closing force, result in a corresponding displacement of the slide 2 and the core 10. A desired and controlled movement of the slide 2 and the core 10 relative to the fixed mould insert 9, in particular along the sliding surfaces 9a and 9b according to FIG. 4, is ensured by means of an adequate control or feedback control, respectively, of the pressure condition in the mould cavity 8 by means of the injection unit 6 as well as by an adequate control of the linear drives 14, 15.

The injected compound which, for example, is a thermoplastic melt, solidifies gradually and beginning from its liquid initial state, which is symbolised by the areas indicated by the reference numbers 18 and 19, depending on pressure, temperature, and time over the distance covered by the expanding mould cavity 8, for example in the area of the flow shadow 19a, 20a of the moulding cavity 8. The reference numbers 19 and 20 denote areas of the injected compound in different cooling or solidification phases, respectively. At the sliding surface 9a of the mould insert 9, between the injected compound 18, 19, 20 and the mould insert 9, a relative movement takes place which is comparable with the one during the forming process at an extrusion nozzle. At the slide 2, no relative movement with respect to the injected compound takes place, which allows the formation of three-dimensional geometry elements 20b and structured surfaces 8a. In the area of the sprue bush 7 and around the core 10, in particular in the area 18a, additional plasticised compound is delivered and continuously forms new surfaces in the flow direction; at the same time, the elongation of the moulded part takes place.

Finally, according to FIG. 5, the compound delivered first is already totally solidified in the area 21 so that this part of the moulded part can leave the mould. The area 21 detaches from the fixed mould insert 9 as well as from the core 10. The linear drive 15 of the core 10 is stopped; the gas valve 16a is opened to fill-up the developing cavity with a medium 17a. The pressure of the medium flowing-in can be chosen such that the compound which has not completely solidified yet in the developing cavity, is pressed by the pressure-exposed medium into the mould walls of the slide 2 and the mould insert 9 until complete solidification. Thus the profiled moulded part is calibrated utilizing the internal pressure.

When the profiled component formed in this manner reaches the intended length, the slide 2 is also stopped by stopping the linear drive 14. Analogue to a conventional injection moulding process, the injection cycle is continued or terminated, respectively, with a dwell pressure phase and cooling phase. After solidification of the sprue and the metering, the injection unit 6 is moved back. After complete solidification of the profiled moulded part, the core 10 is moved back until it is outside of the moulded part. Now a filling of the cavity with a reactive and/or solidifying liquid can take place. After that, the mould is opened, as shown in FIG. 6; the mould parting areas are indicated by the reference numbers 23a, 23b. In order to eject the moulded part 23, depending on the actual conditions, conventional, mechanical, pneumatic, hydraulic, or electrical ejector elements, which are not shown separately, can be activated. As with conventional injection moulding methods, the removal of the moulded part 23 can take place manually, by means of an appropriate device, or by gravity. Finally, the slide 2 is moved back again into its initial position by means of an appropriate activation of the linear drive 14. In addition, the core 10 is moved back again into its initial position so that after closing the mould, the condition according to FIG. 1 is reached again, and an injection cycle can be initiated again.

With such an injection mould, components of different geometry can be produced. Thus, a hollow profile, or a profile which is closed on the front side can be used as insert, as long as the inherent rigidity of the insert resists the injection pressure. In this case, a core is not required, and the insert can be moved via an adaptor at the rear end by the linear drive 15 together with the profiled moulded part. A coupling of inserts with the slide 2 provides further variants. If, instead of the two guide rails 12, guide rails are used which are moveable by linear drives and are moveable normal to the moving direction of the slide 2, this will result in an additional degree of freedom of the formation normal to the main direction of the component. Thereby the possibility is given to produce components along a non-linear path within the scope of the dimensions of the mould construction. In this manner, continuously curved profiles, or profiles with angular transition areas can be produced. Another possibility for producing of curved profiles results from the use of curved slides or mould inserts, respectively. In doing so, the slide 2 can be moved by a linear drive of the described type, for example, along a circular path relative to the fixed mould components.

FIG. 7 shows the injection mould positioned in a conventional injection moulding installation. The shown injection moulding installation is only one of the possible embodiments of an injection moulding installation.

In FIG. 7 and the further FIGS. 8, 9, 10a, and 10b showing the injection moulding installation, on the one side of the injection moulding installation, a moveable machine clamping plate 40, a hydraulic unit 41 for the actuation of the machine clamping plate 40, adjustment and fixation units 42, as well as guiding units 43 and a machine frame 54 are provided as the main components.

On the other side of the injection mould, the injection moulding installation comprises a fixed machine clamping plate 50 and an injection unit 51, to which the starting materials are delivered through a material funnel 52. A screw feeder within a cylinder 53 transports the material from the injection unit 51 to the sprue bush of the injection mould and is coupled here. Further are illustrated a machine frame 54, as well as a hydraulic unit 55 for applying the compressing and closing forces.

A typical positioning of the injection mould is shown in FIG. 7. The clamping plate 4b is attached to the moveable machine clamping plate 40 by means of clamping elements 44, and the clamping plate 4a is attached to the fixed machine clamping plate 50 by means of the clamping elements 56. Hence, the injection mould can be removed completely from the injection moulding installation, and the same can be used for producing of components in conventional or other injection moulds, respectively.

Based on the typical positioning of the injection mould shown in FIG. 7, according to the invention, different integration variants of the function of its modules, or of components of its modules, respectively, are possible. For this purpose, one module or more of the described modules 30, 31, 32, and 33 can be functionally integrated as a whole, or partially, in the injection moulding installation, thereby becoming components of the injection mould installation. Thereby, certain functions are not provided by the injection mould any more, but are taken over in a part, or in a plurality of essential parts by the injection moulding installation.

Figure 8:
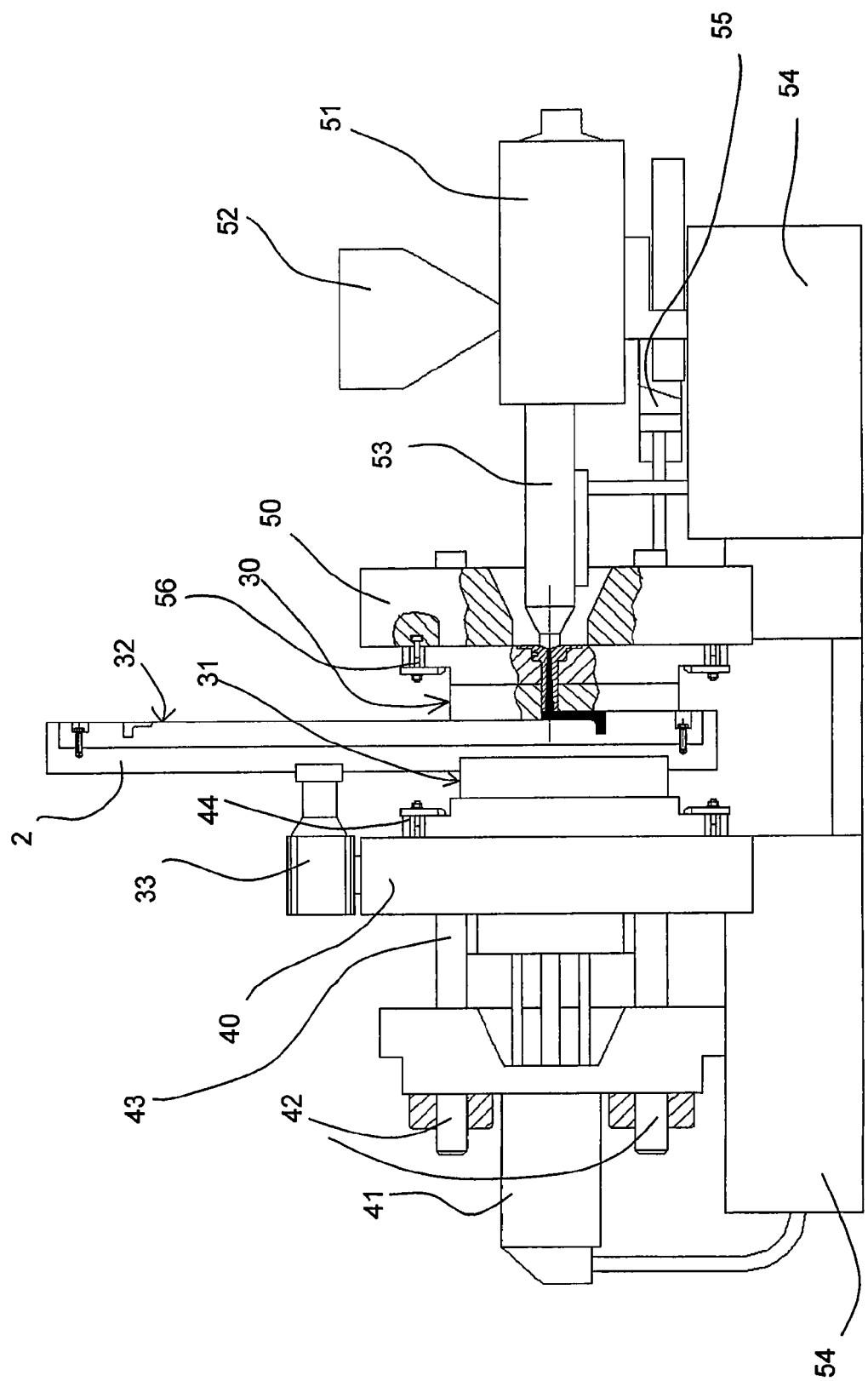

FIG. 8 shows a possible integration stage in which the drive module 33 is integrated in the injection moulding installation. The drive module 33 is built on the closure-side and moveable machine clamping plate 40 and is fixed connected thereto in this manner. The units required for moving the components of the slide module 32, such as motors, drives, gears, and the like, are provided by the injection moulding installation. The nozzle-side mould module 30, the closure-side mould module 31, and the slide module 32 are modules which are detachable and hence replaceable. The nozzle-side mould module 30 and the closure-side mould module 31 are positioned on the machine clamping plates 40, 50 by means of clamping elements 44 and 56.

The drive module 33 or its units, respectively, can be connected with the slide module 32 by means of appropriate interfaces, for example quick couplings and the like, which are designed according to the state of the art. The feedback control and control of the drive module 33 or the components of the module 33, respectively, is carried out either fully integrated as a component of the complete installation control, or partially integrated by means of control and feedback control module which is connected with the installation control.

Figure 9:
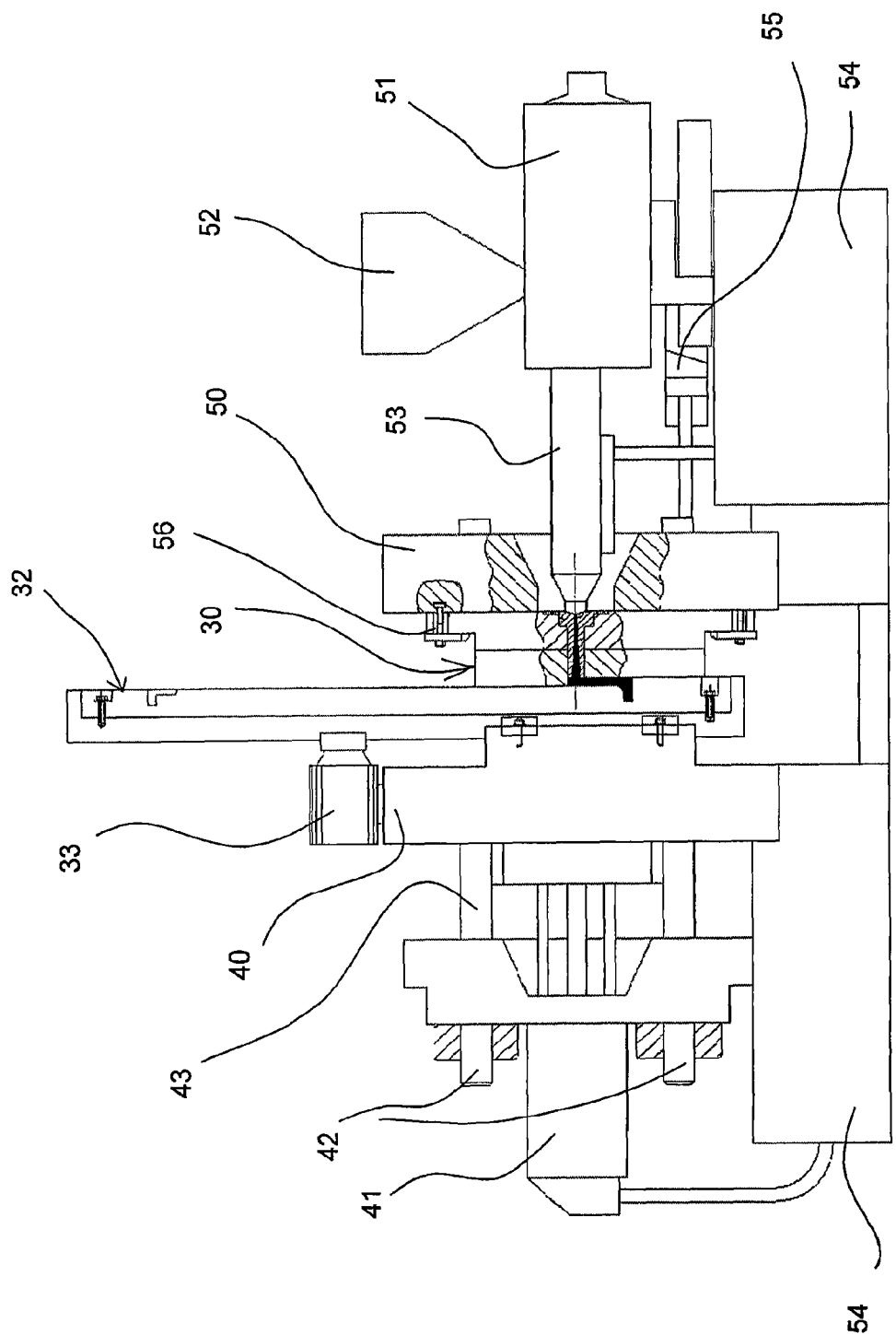

A further integration stage, in which the drive module 33 as well as the closure-side components 31 are integrated in the injection moulding installation, is shown in FIG. 9. The drive module 33 is integrated analogue to FIG. 8; the closure-side mould module 31 is eliminated by making its components elements of the moveable machine clamping plate 40. The moveable machine clamping plate 40 is hence provided with the components and interface parts required for the support and the guidance of the slide 2 (FIG. 1). The slide module 32 and the nozzle-side components 30 remain from the original injection mould. This injection moulding installation allows, for the production of components with different geometries, in particular different lengths, to replace the slide of the slide module as well as the nozzle-side mould module, in particular by means of its forming inserts, in a simple manner and with minor efforts. This embodiment hence offers economic advantages compared to the embodiment comprising an autonomous injection mould, in particular when differently structured components are to be produced frequently.

Figure 10A:
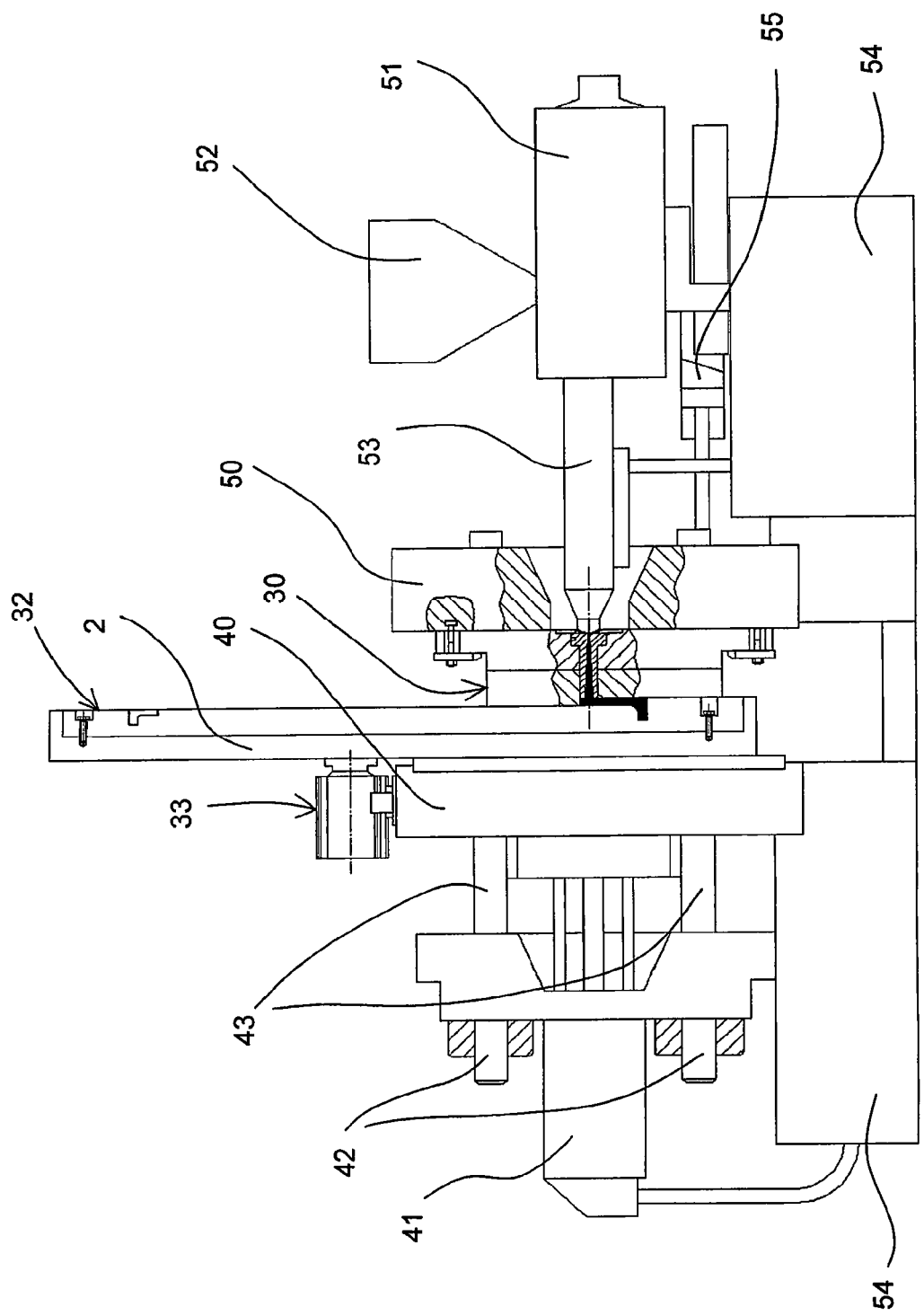
Figure 10B:
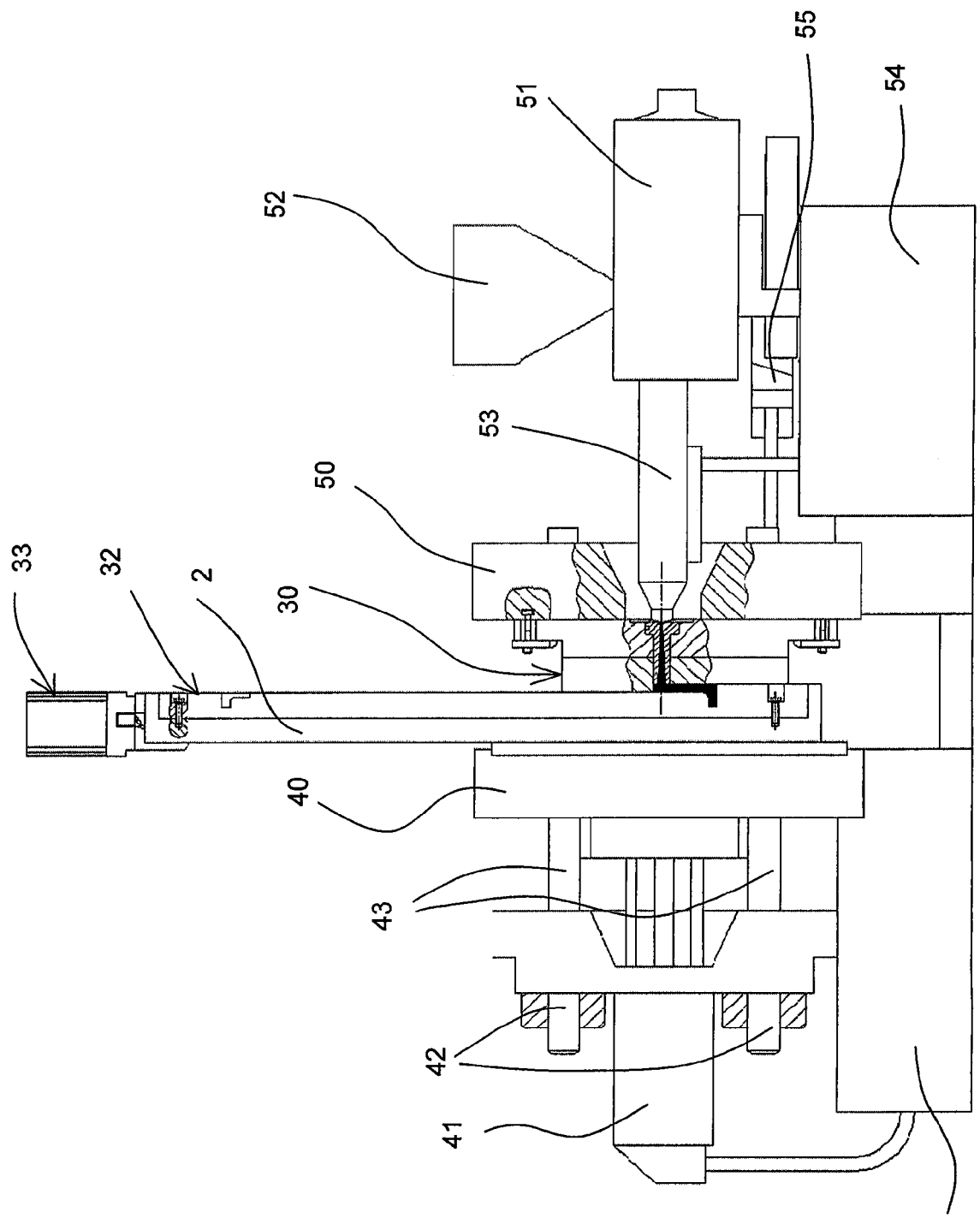

In a further integration stage, of which two design variants are shown in the FIGS. 10a and 10b, the slide 2 of the slide module 32 is functionally integrated in the injection moulding installation. Elements for guidance and support of the slide 2, as well as the slide 2 are integrated or built in, respectively, into the closure-side and moveable machine clamping plate 40. Also the drive module 33 is designed as an integral part of the injection moulding installation. FIGS. 10a and 10b show different variants with respect to the arrangement of the drive module 33; the variant in FIG. 10a is analogue to the embodiment according to FIG. 8, and in FIG. 10b, an arrangement of the drive module 33 is provided at the front side end of the integrated slide. The mould inserts required or desired, respectively, for the design of the forming area can be mounted replaceable on the integrated slide. By means of a replacement of mould inserts at the slide as well as at the nozzle-side mould module 30, components with different geometries can be produced. Although the predetermined geometry of the slide limits the number of possible component geometries compared to the already described partial integration, whereby in particular the component length is limited by the predetermined slide length, such a highly integrated installation concept offers economic advantages in the production of components in high quantities.

According to an embodiment which is not shown here, the nozzle-side mould module 30 can also be integrated in the injection moulding installation. An existing component of the injection moulding installation is adapted or attached such that it takes over at least a part of the function(s) of the nozzle-side mould module 30. In this case, only the directly forming components, the inserts provided on the closure side and the nozzle side, could be replaced. Such a full integration represents a very cost-effective variant with respect to the investment cost for the production of products or components, respectively. In particular when a high quantity is produced, the costs of such installations are significantly lower compared to a "non-integrated" installation.

The ejector unit required for the ejection of the formed component can be accommodated in the slide module 32 as well as in the mould inserts. As already mentioned, the ejection of the produced components at the end of the injection moulding process can take place in a conventional manner.

The invention is applicable or usable, respectively, in all known injection moulding installations, independent from the respective arrangement of the components of the injection moulding installation.

The invention claimed is:

1. An injection molding installation with a fixed machine clamping plate and a moveable machine clamping plate, at least one injection unit, and an injection-molding device which is located between the machine clamping plates for producing at least partially elongated profiled parts, said installation, comprising:

a closure-side mold module which is assigned to one machine clamping plate, a nozzle-side mold module which is assigned to the other machine clamping plate, a slide module which is located between the closure-side and nozzle-side mold modules and has a slide arranged in a moveable manner on one of the closure-side and nozzle-side mold modules, wherein said slide forms at least part of a mold cavity, and a drive module for controlling the movement of the slide module, wherein the movement of the slide module contributes to form said profiled parts in a predetermined dimension and shape inside and outside the mold modules, and wherein at least one of the closure-side mold module and the nozzle-side mold module is functionally integrated with the corresponding one of the machine clamping plates.

2. The injection molding installation according to claim 1, characterized in that one of said modules is not functionally integrated with the corresponding one of the machine clamping plates, and said module is removable from said corresponding machine clamping plate and replaceable.

3. The injection molding installation according to claim 1, characterized in that the components of the closure-side mold module of the injection molding device are realized as components of the moveable machine clamping plate.

4. The injection molding installation according to claim 1, characterized in that the components of the nozzle-side mold module of the injection molding device are realized as components of the fixed machine clamping plate.

5. The injection molding installation according to claim 1, characterized in that the slide of the slide module is mounted and guided on the moveable machine clamping plate.

6. The injection molding installation according to claim 5, further comprising replaceable mold inserts positioned on or in the slide module.

7. The injection molding installation according to claim 1, characterized in that the drive module is attached to one of the machine clamping plates.

8. The injection molding installation according to claim 7, characterized in that the drive module is mounted on the side of the moveable machine clamping plate, and is provided with interface elements for a detachable coupling to the slide and/or to further moveable mold components.

9. The injection molding installation according to claim 7, characterized in that the drive module is mounted on the side of the moveable machine clamping plate, and is provided with interface elements for a detachable coupling to the slide and/or to further moveable mold components.

10. The injection molding installation according to claim 7, characterized in that the drive module including its components is controlled by a central installation.

11. The injection molding installation according to claim 1, characterized in that the drive module is attached to the slide.

* * * * *